July 8, 1969  L. T. DOCKER  3,454,054
SPRING SEATS AND THE LIKE ARTICLES
Filed March 13, 1967
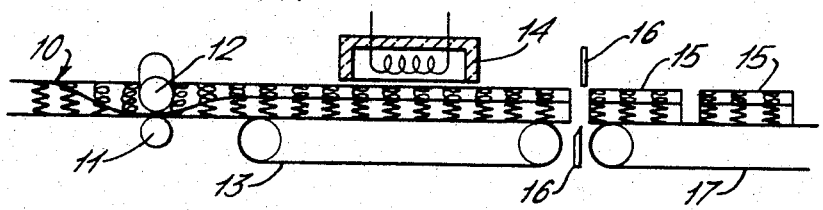
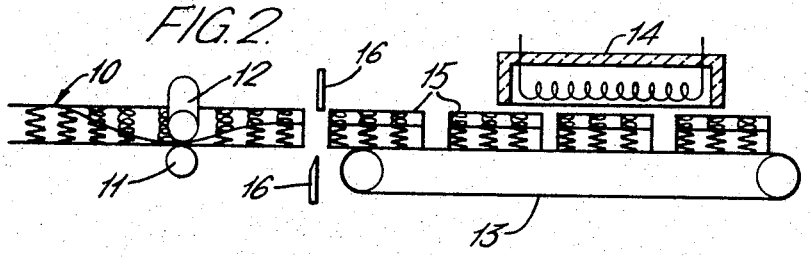
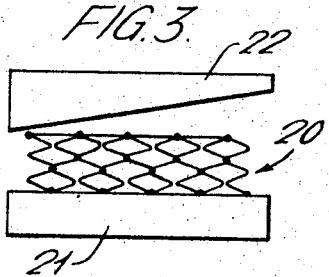
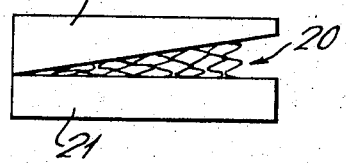
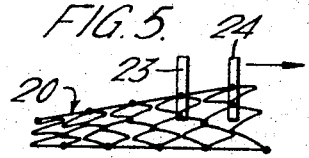
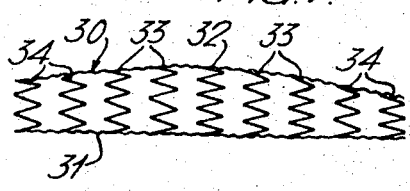
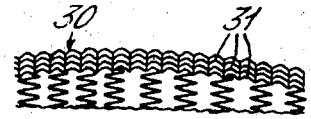

United States Patent Office 3,454,054
Patented July 8, 1969

3,454,054
SPRING SEATS AND THE LIKE ARTICLES
Leslie Thomas Docker, Chadwick End, England, assignor to Slumberland Group Limited, Tyseley, Birmingham, England, a British company
Filed Mar. 13, 1967, Ser. No. 622,748
Claims priority, application Great Britain, Mar. 12, 1966, 10,954/66
Int. Cl. B21f 35/00
U.S. Cl. 140—89                          7 Claims

ABSTRACT OF THE DISCLOSURE

In the manufacture of a spring centre for seat-squabs, seat-backs, etc., an array of coil springs connected together side-by-side is deformed so that the lengths of at least some of the springs are permanently altered. The resulting stresses are at least partly relieved by heat treatment. Individual arrays are severed from a band of springs after deformation and before or after the subsequent heat treatment.

---

This invention relates to spring seats and the like articles having spring centres, such as cushions, squabs, seat-backs, back-rests, mattresses, and furniture generally, the invention being particularly applicable to seats for motor vehicles.

Hitherto, in the manufacture of spring seats and the like, and particularly in the manufacture of seats for motor vehicles, in which the overall shape of the spring centre is other than rectangular in plan, side view or elevation, it has been customary to make and assemble numerous individual springs of different sizes and shapes to achieve the desired overall shape of the spring centre. This practice is necessarily both costly and time consuming, and the object of the present invention is to overcome or reduce these difficulties.

From one aspect the present invention consists in a method of making a shaped spring centre from a spring assembly characterised in that the method includes the steps of deforming the spring assembly to an extent such that it retains the desired shape when freed, and heat-treating the spring assembly so as at least partially to relieve the internal stresses produced by the deformation.

From another aspect the invention consists in a shaped spring centre made by the method outlined in the last preceding paragraph.

The spring assembly may be of such a size that after deformation it is of the correct shape and size to form a spring centre. Alternatively the spring assembly may be severed to form a plurality of separate spring centres after deformation of the spring assembly, and either before or after the heat treatment.

The invention will now be more particularly described with reference to the accompanying drawings, in which:

FIGURE 1 is a diagrammatic side view of apparatus illustrating one method in accordance with the invention, FIGURE 2 is similar to FIGURE 1 but illustrates an alternative method, FIGURES 3, 4, 5 and 6 are diagrammatic side views illustrating successive steps in carrying out another method in accordance with the invention, and FIGURES 7 and 8 are diagrammatic side views illustrating an optional feature of the invention.

FIGURE 1 illustrates a process for making shaped spring centres of the kind which may be used in the seats of motor vehicles.

The starting material for the process is a spring assembly 10. The assembly is of uniform height and width and is of indefinite length; in a convenient method it is added to continuously as the process proceeds. The assembly may be of any desired construction and may, for example, comprise an array of individually formed coil springs arranged with their axes upright and parallel to one another, each spring being connected to its neighbours in a known manner such as by helical wires or by clips. The invention is particularly applicable, however, to spring assemblies of the kind comprising an array of coil springs arranged with their axes generally upright and characterised in that the springs are arranged in straight lines extending lengthwise of the assembly, all the springs in any one line being formed from a single length of wire. Particularly suitable for use in carrying out the invention are spring assemblies made as described in British Patent No. 937,644 of Willi Gerstorfer.

The assembly 10 is fed forwards intermittently, to the right as seen in FIGURE 1, and passes between a pair of rollers 11 and 12. The lower roller 11 is horizontal and the upper roller is inclined in such a manner that the assembly is deformed to a wedge-shaped cross-section as it passes between the rollers. On leaving the roller the assembly is free to return towards its original shape but does not regain its original shape as a part of it has been strained beyond the elastic limit of the component wire. The deformed assembly then passes on a conveyor 13 through a heat-treatment chamber 14 where it is heated to a temperature sufficient to relieve, substantially completely, the internal stresses induced by the deformation. Finally the assembly is divided into short length 15, by suitable dividing means 16, the dividing means serving to cut the wires when the spring assembly is made from lengths of wire. The short lengths 15 are carried away by a further conveyor 17, and are used as the spring interiors of motor vehicle seats.

FIGURE 2 illustrates an arrangement differing from that shown in FIGURE 1 principally in that the spring assembly 10 is divided into lengths 15 before being heat-treated rather than after being heat-treated.

FIGURE 3 shows a spring assembly 20 of the kind described in British Patent No. 937,644 aforesaid, the assembly being of square or rectangular shape in plan. The assembly is placed between dies 21 and 22, the lower die 21 being flat and the upper die 22 being inclined. The dies are brought together as shown in FIGURE 4 so that the assembly is deformed, and are parted again to free the assembly which is then shaped approximately as shown in FIGURE 5. Fingers 23 and 24 are then inserted in each line of springs, as shown in FIGURE 5, the fingers 23 being held stationary and the fingers 24 being moved in the direction of the arrow to deform further the springs at the taller end of the assembly and cause the final shape of the assembly to be approximately that shown in FIGURE 6. In this latter deformation those parts of the wires joining adjacent springs are lengthened somewhat at the expense of the wire constituting the springs, in other words the springs are uncoiled slightly. The resulting spring assembly, shown in FIGURE 6 is heat-treated to bring about complete or substantially complete stress-relief, and the resulting spring centre may be used in a motor vehicle seat.

Although the overall shape of the spring centre may be the required shape, it may be that the arrangement of springs and in particular the support afforded by the springs in the spring centre may not be that required. To overcome or reduce this difficulty additional springs and/or supports may be added to the shaped spring centre. For example the stiff wire members each in the shape of the letter U may be incorporated in spring centres in accordance with the present invention by having their parallel limbs inserted into adjacent helical connecting wires at one face of the assembly. Such stiff wire members may be used, for example, to stiffen the overhanging edge 25 of the spring centre 20.

The springs in the assemblies described thus far are all of the same shape, but it is within the scope of the invention to use an assembly made of springs some of which differ in shape from others. For example the spring assembly 30 shown in FIGURE 7 comprises lengths of wire arranged side by side, each length being bent to form a row of coil springs with their axes generally parallel to one another, the lengths being interconnected by helical wires 31 at the upper and lower faces of the assembly. The springs in the centre row 32 are taller than those in the rows 33 on each side of it, and these in turn are taller than those in the rows 34 at the sides of the assembly. The shape of the assembly is thus rounded, as illustrated. If the assembly 30 is then deformed, as by being passed between rollers or between dies similar to those shown in FIGURES 3 and 4, the assembly may assume the shape shown in FIGURE 8. It can then be heat-treated as described above.

Spring centres in accordance with the invention may conveniently be made from wire of the kind usually used in making conventional spring centres. A typical form of wire is that known in the trade as "bedding and seating quality wire." This is a hard drawn steel wire with a carbon content usually between 0.6% and 0.7%, a typical wire having a carbon content of 0.67%, and a tensile strength usually between 95 and 134 tons per square inch (150 kg. per square mm. and 211 kg. per square mm.), a typical wire having a tensile strength of 125 tons per square inch (197 kg. per square mm.). The wire used is usually of between 15 and 18 S.W.G. (1.83 mm. and 1.22 mm.) and typically is 16½ S.W.G. (1.53 mm.) When using bedding and seating quality wire in carrying out the present invention the heat treatment is preferably carried out in the manner customarily employed. In a typical method the assembly is heated to 500° F. (260° C.), though it may be heated to 550° F. (288° C.), and is then allowed to cool.

I claim:

1. A method of making a shaped spring centre from a spring assembly of the kind comprising an array of coil springs connected together and disposed side-by-side with their axes extending transversely of the array, which method comprises deforming the spring assembly so as to alter the lengths of at least some of the springs in the array and to an extent such that they retain the desired shapes when freed, and heat-treating the spring assembly so as at least partially to relieve the internal stresses produced by the deformation.

2. A method according to claim 1 in which the spring assembly is divided to form a plurality of separate spring centres after deformation of the spring assembly but before heat treatment.

3. A method according to claim 1 in which the spring assembly is divided to form a plurality of separate spring centres after it has been deformed and heat-treated.

4. A method according to claim 1 in which the spring assembly is deformed by being compressed between suitably shaped dies.

5. A method according to claim 1 in which the spring assembly is deformed by being passed between rollers.

6. A method according to claim 1 in which the spring assembly is formed from springs which are, initially, of different shapes from one another.

7. A method according to claim 1 in which the deformation of the spring assembly comprises the pulling open of the spring assembly.

References Cited

UNITED STATES PATENTS

| | | | |
|---|---|---|---|
| 490,845 | 1/1893 | Foster et al. | 140—89 |
| 2,880,861 | 4/1959 | Sklar et al. | 29—173 |
| 3,343,573 | 9/1967 | Dillon | 140—89 |

CHARLES W. LANHAM, *Primary Examiner.*

LOWELL A. LARSON, *Assistant Examiner.*

U.S. Cl. X.R.

72—364; 140—107